United States Patent Office 3,551,448
Patented Dec. 29, 1970

3,551,448
METHYL α-(METHYLSUCCINIMIDO) ACRYLATE
Martin Cole, Leigh, near Reigate, Surrey, and George Newbolt Rolinson, Newdigate, Surrey, England, assignors to Beecham Group Limited, Brentford, Middlesex, England, a British company
No Drawing. Filed Oct. 8, 1968, Ser. No. 765,990
Claims priority, application Great Britain, Oct. 14, 1967, 46,945/67
Int. Cl. C07d 27/10
U.S. Cl. 260—326.3                                 1 Claim

ABSTRACT OF THE DISCLOSURE

Methyl α-(methylsuccinimido) acrylate of the formula

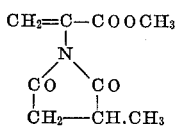

is produced from *Aspergillus versicolor*. The compound is useful as an insecticide.

---

This invention relates to a new antibiotic, designated "MM. 4086" and to methods for the production thereof.

Antibiotic MM. 4086 is produced by the cultivation of certain micro-organisms including strains of *Aspergillus versicolor*. Cultures which are particularly suitable for its production include *Aspergillus versicolor* strains IMI 129488 (BRL 856) ATCC 20171, IMI 129489 (BRL 874) ATCC 20172, IMI 94159 ATCC 20173 and IMI 96228 ATCC 20174. It is to be understood that as regards the production of MM. 4086 the present invention is not limited to the use of the aforementioned strains of *Aspergillus versicolor*, but also includes the use of variants of these organisms such as are obtained by mutation.

A full taxonomic description of the micro-organism *Aspergillus versicolor* is given in "A Manual of the Aspergilli," C. Thom and K. B. Raper, Bailliere, Tindall and Cox, 1945.

The antibiotic MM. 4086 is produced by first growing the culture of micro-organism to be used on a suitable medium to allow sporulation. In the case of strains of *Aspergillus versicolor* a glycerol-molasses agar is suitable and after inoculation the culture is incubated at 26° C. for 1 to 2 weeks. The spores are then washed off with sterile water and this spore suspension is then used to inoculate a liquid medium in which the mould grows and produces the antibiotic. Such a growth may be used to inoculate a second batch of liquid culture medium for the production of MM. 4086.

The fermentation medium should contain sources of assimilable carbon and assimilable nitrogen together with inorganic salts. Suitable sources of nitrogen include malt extract, distillers solubles, corn steep liquor, soya bean flour, cotton seed meal, and ammonium and nitrate nitrogen. Suitable carbon sources include malt extract, glucose, lactose, dextrin or starch. The addition of sulphate ions suppresses the yield of MM. 4086, the medium is therefore preferably made up with deionized or distilled water. The fermentation stage in which antibiotic MM. 4086 is produced is carried out under aerobic conditions at a pH preferably within the range 3.5 to 7.0 and at a temperature between 20° and 30° C. and preferably at 26° C. After 3 to 10 days the fermentation is harvested and the antibiotic is then extracted. The fermentation may also be carried out by continuous cultivation methods. Activity is mainly present in the culture filtrate but a certain amount of activity is also associated with the mycelium.

The antibiotic can be extracted from the culture filtrate at pH values between 2.0 and 9.5 with organic solvents including methylene dichloride, toluene and benzene and can be further purified by chromatography on silica gel. The antibiotic is relatively unstable at pH values above 7.0, but at pH 2.0 to 4.5 the activity in aqueous solution is stable for 1 hour at 60° C. and in the dry state the antibiotic is stable for 1 hour at 100° C.

MM. 4086 is an almost colourless viscous liquid with the following properties:

PHYSICAL CONSTANTS

Boiling point: 120°/3 mm. (with decomposition) 60°/0.003 mm. (molecular still)
Refractive index: $n_D^{21}$ 1.4895
Optical activity: $[\alpha]_D^{20}$+22.3 (c. 2% in CHCl$_3$)
Solubility: Very soluble in organic solvents except saturated hydrocarbons

*Analytical data.*—Found (percent): C, 54.3; H, 5.6; N, 6.9. $C_9H_{11}NO_4$ requires C, 54.8; H, 5.6; N, 7.1%.

The molecular weight as determined by mass spectroscopy confirms that the molecular formula is $C_9H_{11}NO_4$.

SPECTROSCOPIC DATA

Ultraviolet (in ethanol): $\lambda_{max}$ 204.5 m$\mu$($\epsilon$10,260)
Infrared (film): $\gamma_{max}$ 1780, 1720, 1645, 1440, 1400, 1370, 1300, 1245, 1205, 1190, 1160 cm.$^{-1}$.
Nuclear magnetic resonance (in carbon tetrachloride):
Two one-proton singlets at $\tau$ 3.53 and 4.22 (terminal methylene).
Three-proton singlet at $\tau$ 6.23 (O-methyl).
Three-proton multiplet in the range $\tau$ 6.8–8.0.
Three-proton doublet centred at $\tau$ 8.65 (C-methyl coupled to single proton).

CHEMISTRY

The presence of a double bond was established by catalytic hydrogenation (over PtO$_2$ in acetic acid) to give a dihydroderivative, $C_9H_{13}NO_4$, which has no insecticidal activity.

Acid hydrolysis of both MM. 4086 and the dihydro derivative gives methylsuccinic acid. In the case of the dihydro derivative alanine is also produced.

These facts, together with the spectroscopic data, establish the structure of MM. 4086 as methyl α-(methylsuccinimido) acrylate:

BIOLOGICAL PROPERTIES

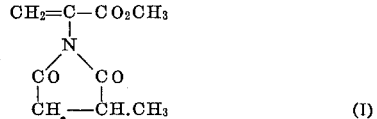                                 (I)

Insecticide MM. 4086 is active against a wide range of insects. It has its highest activity against flies, moths and beetles and is much less active against larvae. For flies it shows very low activity when contacted with the thorax, the activity improving when dimethyl sulphoxide is used as solvent instead of acetone. Marked insecticidal activity is observed when the insects are allowed to walk over a glass surface coated with a thin dry film of the material by evaporation of an acetone solution. The compound is also active as a vapour when insects are placed in a closed vessel and separated from film of compound on glass by a nylon net. Thus for the flies, *Drosophila melanogaster*, *Aedes aegypti* and *Musca domestica* 50% kill was obtained respectively at 3, 3–4 and 7 hours when the base of a closed glass dish was coated with 10 μg./sq. cm. and the height of the dish was 1 cm. As the compound is slightly volatile at room temperature films on glass slowly lost activity. The compound is unstable when exposed to U.V. light.

Activity against the clothes moth larva (*Tineola biselliella*) is of a low order when the larvae are allowed to eat wool treated with the compound. The same is true for the Confused Flour beetle (*Tribolium confusum*) when allowed to eat flour mixed with MM. 4086.

The activity of MM. 4086 against a range of insects is shown in Table 1.

The assay for insecticidal activity of antibiotic MM. 4086 is carried out in 7 cm. petri dishes in which 1–10 ml. of a methylene dichloride solution of the sample under test is evaporated to give a uniform film over the surface of the plate. The petri dishes are then covered with a plastic lid with a hole through which 25 two-day old adult *Drosophila melanogaster* are introduced and the hole then plugged with cotton wool soaked in sugar solution. At hourly intervals the number of dead flies are counted.

EXAMPLE 3

A spore suspension of *Aspergillus versicolor* BRL 856 prepared as described in Example 1 was used to inoculate a fermentation medium of the following composition: malt extract 2% w./v., glucose monohydrate 1%, $NH_4NO_3$ 0.2%, $NH_4Cl$ 0.1% in deionized water at a final pH of 6.5. 100 ml. volumes of medium in 500 ml. conical flasks closed with cotton/gauze pads were sterilized for 15 minutes at 121° C. The inoculated flasks were shaken on a rotary shaker (1.25" throw, 240 r.p.m.) at 26° C. for 5 days.

Whole culture from 20 shaken flasks was filtered through fine cotton gauze on a 15 cm. Buchner funnel to remove mycelium. Filtrate (1600 ml.) was extracted with ⅕ volume dichloromethane and the extract concentrated

TABLE 1.—SPECTRUM OF INSECTICIDAL ACTIVITY OF MM. 4086

| Insect | Stage | Method of application | $LD_{50}$ |
|---|---|---|---|
| *Drosophila melanogaster* | Adult fly | Contact with film on glass | 2 μg./sq. cm. at 2 hours. |
| *Musca domestica* | do | a. Topical on thorax, solution in acetone | 20 μg./fly at 4 hours. |
| | | b. Topical on thorax, solution in dimethylsulphoxide | 20 μg./fly at 1 hour. |
| | | c. Contact with dry film on glass | 2 μg./sq. cm. at 3 hours. |
| *Aedes aegypti* | do | Contact with film on glass | 2 μg./sq. cm. at 1–2 hours. |
| *Blatella germanica* | Half grown nymph | do | 20 μg./sq. cm. at 1 day. |
| *Plodia interpunctella* | Adult moth | do | 10 μg./sq. cm. at 3 hours. |
| *Ephestia elutella* | do | do | 10 μg./sq. cm. at 4 hours. |
| *Tribolium confusum* | a. Half grown larvae | Compound in flour | 50 mg./g. flour at 7 days. |
| | b. Adult beetle | Contact with film on glass | 20 μg./sq. cm. at 5 hours. |
| *Tineola bisselliella* | Larvae | Compound on woolen cloth | 0.4 mg./sq. cm. at 14 days [1]. |
| *Stegobium paniceum* | Adult beetle | Contact with film on glass | 10 μg./sq. cm. at 4 hours. |
| *Ptinus tectus* | do | do | 10 μg./sq. cm. at 6 hours. |

[1] 75% inhibition of weight loss of flannel.

The following examples illustrate the invention:

EXAMPLE 1

*Aspergillus versicolor* strain BRL 856 was grown on agar containing peptone 0.5%, yeast extract 0.1%, molasses 0.25%, glycerol 0.75% and NaCl 2% for 7 days at 26° C. A spore suspension was then prepared by adding 10 ml. of sterile water to a test tube slope and 2 ml. of this spore suspension was then used to inoculate 100 ml. amounts of fermentation medium in 500 ml. conical flasks plugged with cotton wool. Fermentation medium A consisted of malt extract 2%, $NH_4NO_3$ 0.3%, $K_2HPO_4$ 0.1%, pH of medium 6.5 before sterilization by autoclaving at 15 lbs./sq. in. for 15 minutes. Medium B was identical with medium A but with the addition of 1% lactose. After inoculation the fermentation flasks were incubated at 26° C. on a rotary shaker at 280 r.p.m. with a 1" throw for 6 days. The fermentation broth was then shaken with ⅕ the volume of methylene dichloride and 10 ml. of this extract was evaporated in a 7 cm. petri dish for assay of insecticidal activity as described above, the results of which are set out in the following table:

INSECTICIDAL ACTIVITY

| Medium | No. of flies dead out of a total of 25 at the following times | | | | | | pH of fermentation at harvest |
|---|---|---|---|---|---|---|---|
| | 1 hr. | 2 hrs. | 3 hrs. | 4 hrs. | 5 hrs. | 6 hrs. | |
| A | 0 | 5 | 17 | 20 | 24 | 25 | 6.1 |
| B | 0 | 4 | 20 | 25 | | | 4.6 |
| Control [1] | 0 | 0 | 0 | 0 | 0 | 0 | |

[1] No sample.

EXAMPLE 2

*Aspergillus versicolor* strain BRL 874 was used to carry out a fermentation for the production of antibiotic MM. 4086 in exactly the manner described in Example 1 using fermentation medium A. The following table shows the results of the assay of insecticidal activity.

INSECTICIDAL ACTIVITY
[No. of flies dead out of a total of 25 at the following times]

| | 1 hr. | 2 hrs. | 3 hrs. | 4 hrs. | 5 hrs. | 6 hrs. |
|---|---|---|---|---|---|---|
| Fermentation sample | 0 | 4 | 7 | 9 | 19 | 25 |
| Control (no sample) | 0 | 0 | 0 | 0 | 0 | 0 | to 16 ml. The MM. 4086 was then further purified by preparative layer chromatography on silica gel.

Silica gel G was used to prepare 8 plates 40 x 20 cm. x 0.3 mm. thick. 2 ml. concentrated dichloromethane extract was applied as a think streak along the major axis of each plate and the plates were developed in the solvent system n-hexane-iso-propanol-chloroform, 8:1:1 parts by volume. The MM. 4086 band at $R_f$ 0.48 on each plate was scraped off and the combined adsorbant eluted twice with 100 ml. dichloromethane. The band at $R_f$ 0.48 was found by previous experiment to contain material having insecticidal activity against *Drosophila melanogaster*. This $R_f$ 0.48 band was just ahead of a yellow pigment. On evaporation of the combined eluates to dryness MM. 4086 was obtained as an amber coloured oil (60 mg.).

EXAMPLE 4

Spores of *Aspergillus versicolor* BRL 856 were grown on a glycerol/molasses agar as described in Example 1. 50 ml. of sterile deionized water containing 0.02% Tween 80 were added to one agar slant culture in a Roux bottle and the spores suspended by shaking. The spore suspension was inoculated into 75 l. of sterilized seed stage medium contained in a 100 l. stainless steel baffled fermenter. The medium had the same composition as that described in Example 3 except that condensed steam was used in place of deionized water. To control foaming 50 ml. of 10% v./v. Pluronic L81 in soya bean oil was added to fermentation medium before sterilization. The medium was sterilized in the fermenter for 15 minutes at 120° C.

The seed stage culture was stirred by a 7½" vaned disc impeller at 140 r.p.m. and controlled at a temperature of 26° C. Sterile air was supplied by an open ended sparger at the rate of 75 l./minute. At 48 hours 7.5 l. of this seed culture was transferred to 150 l. of sterile fermentation medium contained in a 300 l. stainless steel fully baffled fermenter. The fermentation medium had the same composition as that described above for the seed stage culture and was sterilized in a similar fashion. The fermentation was stirred by an 8½" vaned disc impeller at 240 r.p.m. and controlled at a temperature of 26° C. Sterile air was supplied from an open ended sparger at the rate of 75 l./minute. The fermentation was continued for 4 days by which time the pH had fallen from a starting pH of 6.5 to 4.2. Foaming was controlled by addition of Pluronic L81 antifoam in soya bean oil as required.

Whole fermentation broth (150 l.) was filtered using a filter press precoated with Dicalite 438. Clarified broth was extracted once with one quarter volume dichloromethane. The solvent extract was dried over anhydrous magnesium sulphate (1.5 kg.) and concentrated to a brown oil (9.8 g.). The oil was then purified on a column of methanol impregnated cellulose using the solvent system n-hexane-diethyl ether-chloroform, 8:1:1 parts by volume as eluant.

Fibrous cellulose (Whatman grade CF11) was dehydrated by heating at 115° C. and 116 mm. Hg absolute pressure for 2 hours then immediately immersed in methanol. The resulting slurry was packed in a 10 cm. diameter column to form a bed 40 cm. deep. After washing with two column volumes of eluting solvent, the column was ready for use. The brown oil obtained above was dissolved in eluting solvent (10 ml.) and loaded onto the column which was eluted at 2 l. per hour, collecting 1 l. fractions. Fractions 8–16 were combined and the solvent removed by evaporation yielding a pale amber coloured viscous oil (5 g.). These fractions had been found by previous experiment to contain insecticidal material active against *Drosophila melanogaster*.

Final purification was effected by molecular distillation at 60° C. and 0.003 mm. Hg absolute pressure. The product designated MM. 4086 was an almost colourless viscous liquid (4 g.).

We claim:
1. The antibiotic methyl α-(methylsuccinimido) acrylate of the structural formula:

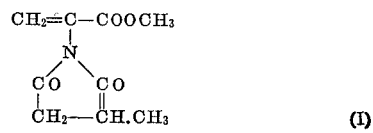

(I)

References Cited

UNITED STATES PATENTS 3,299,096   1/1967   Zienty et al. _____ 260—326.3

ALEX MAZEL, Primary Examiner

J. A. NARCAVAGE, Assistant Examiner

U.S. Cl. X.R.

195—81; 424—274